United States Patent [19]

Grossman

[11] Patent Number: 5,055,693
[45] Date of Patent: Oct. 8, 1991

[54] NESTED REACTOR CHAMBER AND OPERATION FOR HG-196 ISOTOPE SEPARATION PROCESS

[75] Inventor: Mark W. Grossman, Belmont, Mass.

[73] Assignee: GTE Products Corporation, Danvers, Mass.

[21] Appl. No.: 323,739

[22] Filed: Mar. 15, 1989

[51] Int. Cl.$^5$ .............................................. G01N 21/17
[52] U.S. Cl. .............................. 250/436; 250/432 R; 250/373
[58] Field of Search ........... 250/436, 435, 373, 432 R; 204/157.2

[56] References Cited

U.S. PATENT DOCUMENTS

| | | |
|---|---|---|
| 415,652 | 5/1890 | Wiest ..................................... 250/436 |
| 2,935,611 | 3/1960 | Myers ................................... 250/435 |
| 3,414,499 | 12/1968 | Gardner et al. ...................... 250/436 |
| 3,897,331 | 7/1975 | Smith et al. . |
| 3,983,019 | 9/1976 | Botter nee Bergheaud . |
| 4,080,169 | 3/1978 | Kloosterboer et al. ......... 250/432 R |
| 4,379,252 | 4/1983 | Work et al. . |
| 4,514,363 | 4/1985 | Dubrin . |
| 4,527,086 | 7/1985 | Maya . |
| 4,648,951 | 3/1987 | Maya . |
| 4,678,550 | 7/1987 | Grossman et al. . |
| 4,713,547 | 12/1987 | Grossman . |

FOREIGN PATENT DOCUMENTS 0280788 9/1988 European Pat. Off. .
0281687 9/1988 European Pat. Off. .

OTHER PUBLICATIONS

Webster and Zare, "J. Phys. Chem.", 85:1302 (1981).
McDowell et al., "Can. J. Chem.", 37:1432 (1959).
Gunning and Swartz, "Adv. Photochem.", 1:209 (1963).
Waymouth, "Electric Discharge Lamps", MIT Press (1971).

Primary Examiner—Jack I. Berman
Assistant Examiner—Kiet T. Nguyen
Attorney, Agent, or Firm—Martha Ann Finnegan

[57] ABSTRACT

The present invention is directed to an apparatus for use in $^{196}$Hg separation and its method of operation. Specifically, the present invention is directed to a nested reactor chamber useful for $^{196}$Hg isotope separation reactions avoiding the photon starved condition commonly encountered in coaxial reactor systems.

6 Claims, 2 Drawing Sheets

NESTED REACTOR CHAMBER AND OPERATION FOR HG-196 ISOTOPE SEPARATION PROCESS

STATEMENT OF GOVERNMENT INTEREST

The Government of the United States of America has rights in this invention pursuant to Subcontract 4540710 under Prime Contract DE-AC03-76SF00098 awarded by the Department of Energy.

FIELD OF THE INVENTION

The present invention is directed to a method and apparatus useful in the isotopic enrichment of a predetermined isotope of mercury (Hg) from a naturally occurring mercury mixture. While the present invention may be used in the enrichment of any one of the seven naturally occurring isotopes of mercury ($^{202}$Hg, $^{200}$Hg, $^{199}$Hg, $^{201}$Hg, $^{198}$Hg, $^{204}$Hg, and $^{196}$Hg,) it has particularly advantageous application in the photochemical enrichment of the $^{196}$Hg isotope, which has a natural abundance of only about 0.146 percent.

Photochemical mercury enrichment processes are well known and have been well documented in the literature. See for example, Webster and Zare, *J. Phys. Chem.*, 85: 1302 (1982); McDowell et al., *Can J. Chem.*, 37: 1432 (1959); Gunning and Swartz, *Adv. Photochem.*, 1: 209 (1963) and U.S. Pat. Nos., 4,678,550, 4,648,951, and 4,514,363, the teachings of which are hereby incorporated herein by reference.

BACKGROUND OF THE INVENTION

Many devices utilize mercury in their operation, particularly in the field of electric lamps and lighting. Such devices include arc discharge lamps which typically employ mercury as one of the vaporizable components therein. See, for example, Waymouth, *Electric Discharge Lamps*, MIT Press 1971 for a description of the basic principles of such lamps.

In U.S. Pat. No. 4,379,252, (the '252 patent), the advantages of utilizing higher than normal levels of $^{196}$Hg in the Hg added to fluorescent lamps are described and include unexpectedly high efficiency gains in light output. The disclosure of this patent is hereby incorporated herein by reference.

The drawback of using this isotope lies in its high cost. For example, using conventional enrichment techniques, mercury which has been enhanced to contain about 35% of the $^{196}$Hg isotope can cost about $500 per milligram. While only sub-milligram quantities of this isotope need be added to a fluorescent lamp to afford beneficial results, economic realities always play a part in consumer products. Accordingly, it is easy to understand why more economical methods of obtaining this isotope continue to be sought.

Isotopically enriched mercury can be produced by a number of methods. One method involves photosensitized chemical reactions utilizing elemental mercury and various compounds. For example, the compounds HCl and $O_2$ react with mercury atoms when the mercury atoms are excited by resonance radiation, in particular, 2537Å radiation produced in a Hg ($^3P$–$^1S_o$) transition generating isotopically selective reactions. Thus, the Hg compound formed contains Hg enriched in a particular isotope, and the Hg must be separated from the compound into its liquid or free state (i.e., elemental Hg)) in order to recover the isotopically enriched metal.

Product formation in the reaction:

$$^{196}\text{Hg}\,(6^3P) + \text{HCl} \rightarrow {}^{196}\text{HgCl} + \text{H}$$

which is used for $^{196}$Hg isotope separation, can lend to a "photon starved" process after a short period (e.g., one to two hours of operation). One way of avoiding this is to use a nested group of reactors, each with a common longitudinal axis. Product formation first takes place in the outermost nested vessel until "photon starvation" begins, then the next innermost chamber is used. Nesting with at least three levels significantly reduces floor space and reactor system size requirements.

The present invention is thus directed to such a nested reactor and to the process of using such a reactor for the photochemical enrichment of mercury.

INFORMATION DISCLOSURE

The following documents are recited as general background information with respect to the subject matter of the present invention. To the extent deemed necessary by artisans of ordinary skill in the art to which this invention pertains, the teachings of these documents are hereby incorporated herein by reference.

Grossman, U.S. Pat. No. 4,713,547;
Grossman et al., U.S. Pat. No. 4,678,550;
Maya, U.S. Pat. No. 4,527,086;
Durbin, U.S. Pat. No. 4,514,363;
Work et al., U.S. Pat. No. 3,379,252;
Botter nee Bergheaud et al., U.S. Pat. No. 3,983,019;
Smith et al., U.S. Pat. No. 3,897,331;
Grossman et al., U.S.S.N. 815,150, filed 31 December 1985;
European Patent Publication No. 0 281 687, published 14 September 1988, claiming priority of U.S.S.N. 947,217, filed 29 December 1986; and
European Patent Publication No. 0 280 788, published 7 September 1988, claiming priority of U.S.S.N. 947,216, filed 29 December 1986.

SUMMARY OF THE INVENTION

The present invention is directed to an apparatus for use in $^{196}$Hg separation and its method of operation. Specifically, the present invention is directed to a nested reactor chamber useful for $^{196}$Hg isotope separation reactions avoiding the photon starved condition commonly encountered in coaxial reactor systems.

Thus the present invention represents an improvement over other photochemical reactors used for the enrichment of $^{196}$Hg. Such reactors traditionally include a source of light producing mercury excitation radiation of about 2537Å, a glass reactor chamber wherein photochemical reactions take place between mercury and other reactants. The improvement comprising the present invention lies in the use of at least two, preferably at least three, nested reaction chambers, such that as the outermost reactors experience photon starvation, the next innermost nested reactor is utilized, and so-on, until all of the nested reaction chambers ("reactors") have been utilized.

DETAILED DESCRIPTION OF THE PREFERRED EMBODIMENTS

One of the factors which can limit the product formation rate in a photochemical reaction, specifically the isotopic specific reaction:

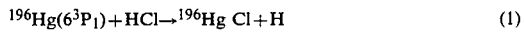

$$^{196}Hg(6^3P_1) + HCl \rightarrow {}^{196}Hg\,Cl + H \qquad (1)$$

is the density of $^{196}Hg$ atoms in the $6^3P_1$ state. This limitation can be due to too few photons entering the reaction chamber.

Figure 1:
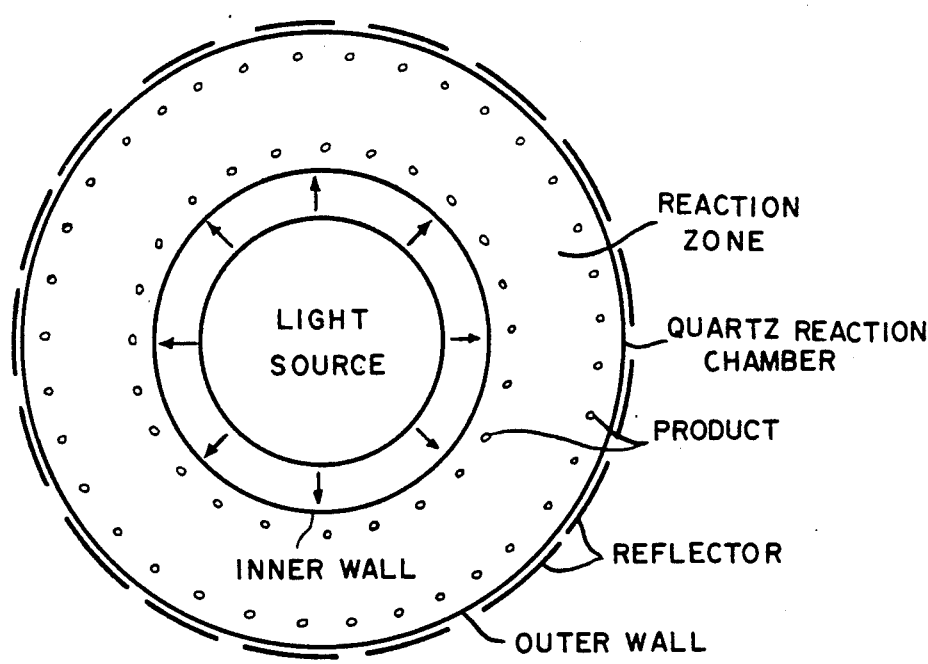
FIG. 1 represents a coaxial mercury enrichment processing apparatus.

While too few photons will not be the initial condition at the start of a batch photochemical enrichment process, as product is deposited on the reactor walls [particularly the inner wall of a coaxial chamber] this condition can eventually be reached. FIG. 1 illustrates one such coaxial type reaction chamber, indicating where product is deposited.

Under extreme conditions in which most of the product is deposited on the inner wall of the reaction chamber, the product formation rate nearly goes to zero after a short time period implying too few photons are reaching the reaction zone.

To overcome this problem, the nested reactors of the present invention were designed. As used herein, the term "nested" refers to photochemical reactors wherein at least two, preferably three of more, individual reactor chambers are "nested" or stacked concentrically about a common photochemical light source.

By using the nested reactors of the present invention, as shown in FIGS. 2 and 3, operating the outer region A for a period of time before "photon starvation" is serious, then switching to the next inner reactor B, a longer operating time and therefore more product can be obtained.

As shown in FIGS. 2 and 3, nesting can be carried out in different ways, each having particular advantages.

Figure 2A:
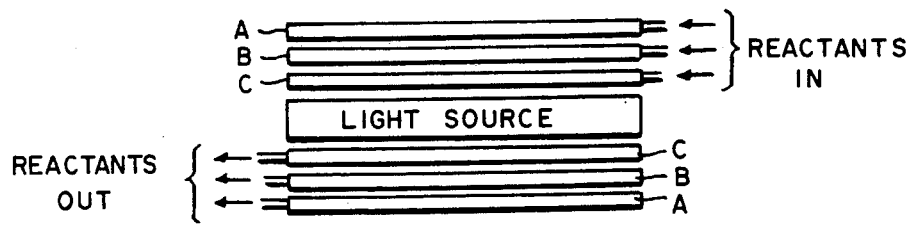
FIGS. 2A and 2B illustrate one embodiment of a nested mercury enrichment processing apparatus according to the present invention, from the cross-sectional and end views respectively.
Figure 2B:
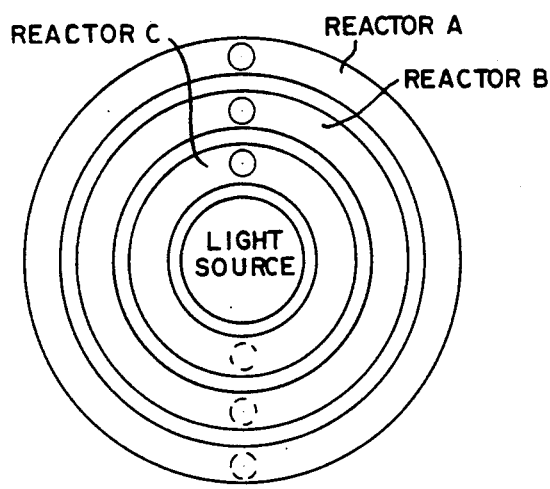

For example, FIGS. 2A and 2B illustrate Case I, wherein the reactors are separable from the nested condition. In this case removable reflecting films can be placed on the outside of each reactor.

Figure 3A:
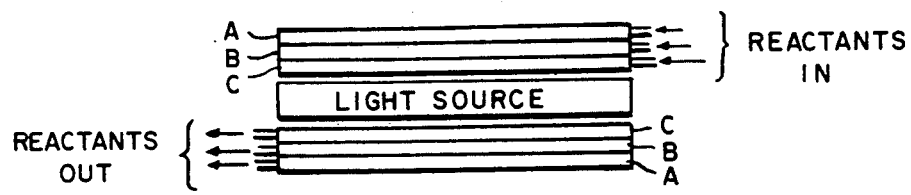
FIGS. 3A and 3B illustrate another embodiment of a nested mercury enrichment processing apparatus according to the present invention, from the cross-sectional and end views respectively.
Figure 3B:
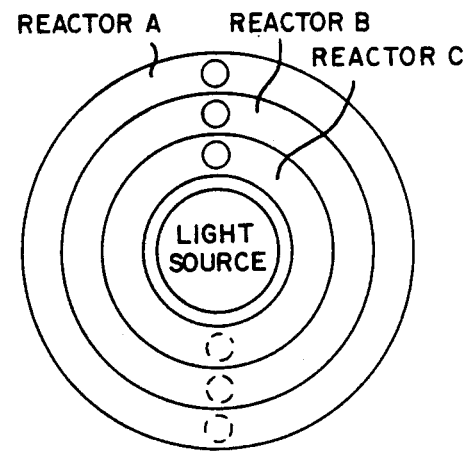

As illustrated in FIGS. 3A and 3B, Case II, the number of individual quartz surfaces are reduced, thereby optimizing transmission of the photochemical light through each nested reactor. The artisan will also recognize that Case II will be less expensive than Case I.

In both cases the amount of reactor space is substantially reduced compared to separate reactors placed side by side. Also, only a single light source is needed in these reactors compared to a multiple of light sources in the non-nested case. The use of nested reactors has the clear potential of reducing operational costs of a photochemical $^{196}Hg$ enrichment system.

All of the standard elements of the reactor system, i.e., the lamp, the filter, and the reactor vessel are formed of a material which is transparent to the desired excitation radiation, particularly 253.7 nm (2537 Å) for $^{196}Hg$. One preferred material is quartz. While the lamp used in the reactor of the present invention may be any low pressure (e.g., about 2.5 Torr) electric discharge type lamp which transmits radiation of about 253.7 nm, those using microwave cavities for the excitation are preferred.

An especially preferred lamp comprises an electroded mercury-inert gas lamp. At least two electrodes are positioned and sealed at each end of a sealed lamp envelope which contains mercury vapor and one or more inert gases. The sealed lamp envelope is surrounded at least in part by an elongated tube which defines a region for controlling a heat exchange medium which controls the temperature of the inner, sealed lamp envelope.

In one embodiment, uniform temperature is created in the Hg lamp by circulating $H_2O$ at a predetermined temperature about an isolated section of the lamp. Other fluids, or inert gases such as argon, helium, xenon and neon, can be selected depending on their boiling point behavior to provide the desired uniform temperature of the inner discharge envelope.

The circulating heat transfer medium also prevents the formation of $O_3$ (ozone) by purging $O_2$ in the vicinity of the lamp. Ozone is created when $O_2$ is exposed to 185 nm radiation which may be emitted by the lamp. Ozone, in turn, absorbs various wavelengths of radiation emitted from the lamp. This is undesirable because radiation having a wavelength of 253.7 nm, useful for the photochemical separation of $^{196}Hg$, is absorbed of $O_3$. Thus, in a preferred embodiment, a fluid or inert gas is circulated about the entire exterior of the lamp envelope, thereby purging all of the $O_2$ from the immediate vicinity of the envelope. This allows for a greater emission intensity of the particular, desired radiation from the lamp envelope.

In a preferred embodiment, the outer lamp jacket comprises a quartz cylinder. This outer jacket serves several purposes. First, it allows for the use of a gas purge, if desired, for eliminating $O_2$ about the transmission section, thereby reducing $O_3$ formation. Second, if the outer jacket is designed to be demountable, it permits the interchange of different inner lamp envelopes. This makes possible the isolation of different Hg isotopic distributions using the same outer jacket. Also, lamp envelopes having different diameters can be used to affect the emitted linewidth of radiation.

The fact that the outer tube can be demountable allows for the use of outer tubes of different types of materials which can selectively filter certain emitted wavelengths. For example, by changing the outer tube material to Vycor 7910, it is possible to filter wavelengths below 200 nm thereby eliminating ozone formation in the region surrounding the lamp.

Figure 4:
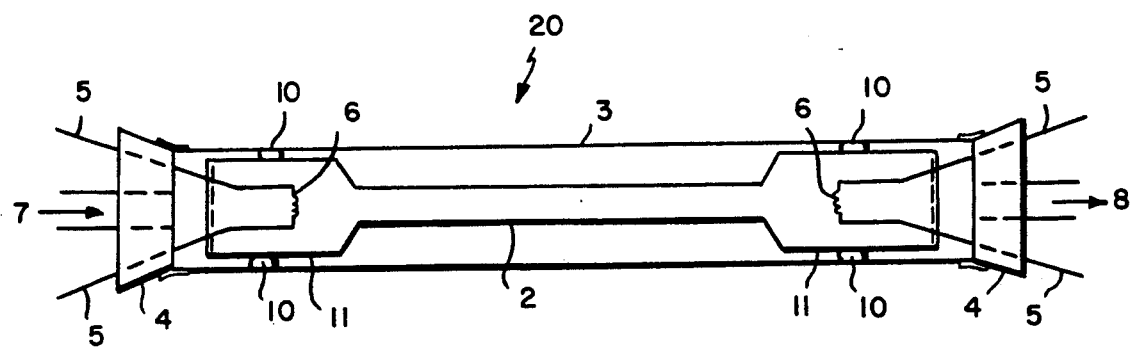
FIG. 4 illustrates one preferred monoisotopic lamp used in the photoreactors of the present invention.

FIG. 4 illustrates the preferred lamp which is used in the reactor of this invention.

The mercury lamp 20 of FIG. 4 comprises an inner lamp envelope 2 and an outer jacket 3. In the preferred embodiment, both the envelope 2 and the outer jacket are constructed of quartz. The envelope 2 can be of various diameters depending on the desired optical depth. A larger diameter provides greater power density and broader bandwidth. For the isotopic separation of $^{196}Hg$, the inner diameter of the envelope is typically about 10 nm. The envelope 2 typically contains a source of Hg such as elemental Hg as well as an inert gas such as argon. However, any inert gas which is compatible with Hg vapor can be used. Typically, between about 1 and 2 mg of Hg is contained within lamp envelopes which have an inner diameter of about 10 mm. The length of the lamp can be from about 30-150 cm with a preferred length of about 40 cm.

A tapered stopper 4, typically of an elastomeric material, is disposed at each distal end of the outer jacket 3 and serves to substantially center the outer jacket around at least one section of the envelope 2. Furthermore, the tapered stopper guides and positions an electrode lead 5 through both the stopper and the outer jacket, and into the envelope where it provides current for the electrodes 6. In the preferred embodiment, the electrodes are shaped as coils and able to withstand a current of at least about 5 amperes. The tapered stoppers also contain openings in their centers which provide for an inlet 78 and outlet 8 stream of circulating heat transfer medium which is preferably water. The heat transfer medium circulates about at least one portion of the inner discharge envelope 2. The heat transfer medium then exits the lamp at outlet 8 contained in the outer jacket. Tubes, 11, preferably comprising a heat resistant glass are connected to each end of the envelope to provide regions to contain the electrodes and to further provide regions for mounting the envelope within the jacket. These tubes 11 are preferably separated from the outer tube with spacers 10 preferably comprising elastomeric materials. It is pointed out that the spacers 11 must have openings which allow the heat transfer medium to travel through the lamp.

The temperature of the inner envelope 2 is controlled by the temperature of the circulating heat transfer medium. As the temperature of the heat transfer medium is increased or decreased, the corresponding temperature of the inner envelope also increases or decreases. The linewidth of the emitted radiation is typically affected greatly by temperatures between 15° C. and 50° C. The emission intensity depends strongly on the temperature of the inner envelope.

The entire lamp assembly can be placed within a mercury vapor filter. In one preferred embodiment, the filter comprises a hollow, axial elongated torus containing mercury vapor and an inert gas. This structure can be formed by the combination of two tubes, preferably quartz, where an inner tube is inserted into an outer tube and the tubes are sealed at both ends. This encloses a medium which can be made to contain a gaseous Hg vapor medium which transmits wavelengths of light desirable for the photochemical separation of $^{196}$Hg or specific isotopes of Hg.

In a preferred embodiment of this invention $^{196}$Hg is produced by enriching mercury compounds using radiation with a wavelength of 253.7 nm. The control of the specific wavelength is very dependent upon the vapor equilibrium temperature within the lamp envelope, which depends, in turn, upon the lowest temperature within the envelope. The vapor pressure of Hg within the envelope (for useful mercury isotope separation) and the intensity of the emitted radiation are proportional with a variation of about 10–15%.

If the intensity of radiation emitted from the lamp increases, the corresponding linewidth of the emitted radiation also increases. This causes other isotopes of mercury to become excited. Such an effect is undesirable, as it leads to a separation which yields a product having lower isotopic specificity. Thus, it is important to control the vapor pressure of the lamps to ensure that radiation of the proper linewidth is emitted. For a further explanation of the relationship between lamp temperature, radiation intensity and 226: 435–436 (1984), the teachings of which are incorporated herein by reference.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. In a photochemical reactor used for the enrichment of $^{196}$Hg in which reactor includes a source of light producing mercury excitation radiation of about 2537Å, a glass reactor chamber wherein photochemical reactions take place between mercury and other reactants; the improvement comprising:
   providing a nested reaction chamber arrangement of at least two separate reaction chambers such that as the outermost chamber experiences photon starvation, the innermost chamber can be used to prolong the enrichment process.

2. The reactor of claim 1, wherein the nested reactor chamber comprises removable reaction chambers.

3. The reactor of claim 1 or 2, wherein the exterior surfaces of the nested reactor chambers are provided with a reflective substance.

4. The reactor of claim 3, wherein the reflective substance on the reactor chambers is aluminum.

5. The reactor of claim 3, wherein the aluminum is a film.

6. The process of producing mercury isotopically enriched in the $^{196}$Hg isotope, which process comprises utilizing the improved photoreactor of claim 1.

* * * * *